United States Patent [19]

Jackson

[11] Patent Number: 4,983,709
[45] Date of Patent: Jan. 8, 1991

[54] AROMATIC COMPOUNDS CONTAINING CYANATE ESTER AND PROPARGYL ETHER GROUPS

[75] Inventor: Roy J. Jackson, Houston, Tex.

[73] Assignee: Shell Oil Company, Houston, Tex.

[21] Appl. No.: 279,383

[22] Filed: Dec. 2, 1988

[51] Int. Cl.$^5$ .................... C08G 65/38; C08G 73/00; C07C 255/00; B32B 27/00

[52] U.S. Cl. .................... 528/230; 528/125; 528/170; 528/172; 528/181; 528/210; 528/219; 528/322; 526/262; 558/519; 560/301; 428/423.1; 428/473.5

[58] Field of Search ............... 528/161, 170, 172, 210, 528/219, 322, 125, 230; 560/301; 526/262; 428/473.5, 423.1; 558/419

[56] References Cited

U.S. PATENT DOCUMENTS

| | | | |
|---|---|---|---|
| 3,300,456 | 1/1967 | Hay | 526/135 |
| 3,553,244 | 1/1971 | Grigat et al. | 560/301 |
| 3,594,175 | 7/1971 | Hay | 430/270 |
| 4,110,364 | 8/1978 | Gaku et al. | 528/170 |
| 4,226,800 | 10/1980 | Picklesimer | 558/419 |
| 4,298,720 | 11/1981 | Yamazaki et al. | 528/322 |

FOREIGN PATENT DOCUMENTS 1149697  4/1969  United Kingdom .

OTHER PUBLICATIONS

Hay, A. S. et al., *Polymer Letters,* Part B, vol. 8, No. 2, pp. 97–99, Feb. 1980.

Dirlikov et al., "Proceedings of ACS Div. of Polymeric Materials: Science & Engineering"; 59, Fall 1988, Los Angeles.

*Primary Examiner*—John Kight, III
*Assistant Examiner*—P. Hampton-Hightower

[57] ABSTRACT

New aromatic compounds containing at least one cyanate ester and at least one propargyl ether group, each independently directly attached to a ring carbon atom(s), are useful in the preparation of resins having a low dielectric constant.

35 Claims, No Drawings

AROMATIC COMPOUNDS CONTAINING CYANATE ESTER AND PROPARGYL ETHER GROUPS

BACKGROUND OF THE INVENTION

1. Field of the Invention

The invention relates to new aromatic compounds containing cyanate ester and propargyl ether groups, their preparation, and to polymers prepared from these aromatic compounds.

2. State of the Art

Thermoset resins are known based on propargyl ether aromatic compounds, e.g., U.S. Pat. No. 4,226,800. Because polymerization of these resins does not involve the creation of polar groups, they should be prime candidates for applications requiring low dielectric constant and low moisture uptake. Based upon polymers of similar structure, i.e., acetylene terminated polymers, they may also be expected to have outstanding high temperature properties. Unfortunately, these resins have a high temperature onset of polymerization and a high heat of polymerization, making it difficult to process them in many standard industrial applications such as making prepregs for electrical applications. It is therefore an intention of this invention to prepare new propargyl ether resins so that one can easily apply them in such applications.

SUMMARY OF THE INVENTION

The present invention is directed to mixed functionality aromatic compounds having at least one cyanate ester group and at least one propargyl ether group, each independently directly attached to ring carbon atoms of an aromatic (aryl) organic group derived from di or polyhydric phenolic materials. Suitable cyanate ester-proparagyl ether aromatic compounds can contain from about 6 to about 100 carbon atoms including those represented by Formula 1.

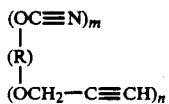
(1)

wherein m is a number of at least 1, n is a number of at least 1 and R is an aromatic (aryl) organic group containing from about 6 to about 100 carbon atoms comprising an aromatic ring or an aromatic ring (a) bonded directly or through a bridging atom or group to or (b) fused to one or more aromatic or cycloaliphatic rings, each aromatic ring of R having from zero to all the available aromatic ring positions independently substituted by the cyanate ester or propargyl ether groups.

The presence of the cyanate ester group with the propargyl ether group in the aromatic compounds enables curing of the resins at temperatures below 200° C. The resins resulting from these compounds of Formula 1 have a desirable combination of properties, such as low moisture sensitivity, low dielectric constant, and high temperature properties, e.g., high Tg, as opposed to propargyl ether polymers which have high temperature onset of polymerization making them impractical for processing into electrical laminates. Also, curing reactions involving these compounds can be controlled readily, in spite of exothermic heat generated, since the active cyanate groups polymerize at a lower temperature, thus building molecular weight prior to polymerization of the propargyl ether portion of the overall compound.

Suitable aromatic groups for R include:

(i) residues having a valance of at least 2 and derived from aromatic hydrocarbons containing 6 to 16 carbon atoms, such as benzene, naphthalene, anthracene, fluorene, or pyrene;

(ii) organic groups consisting of a plurality of aromatic rings bonded directly or through a bridging atom or group, for example, those expressed by the following Formula 2:

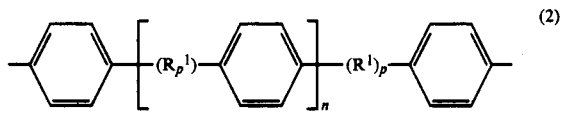
(2)

wherein n is zero or 1; each p is independently 0 or 1, and each $R^1$ is independently a divalent aliphatic or aromatic hydrocarbon group containing up to 14 carbon atoms, an oxygen atom, a sulfur atom, a carbonyl group, a sulfonyl group, a sulfinyl group, and alkyleneoxyalkylene group containing up to 4 carbon atoms in each alkylene group, an imino group:

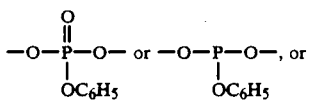

(iii) groups derived from novolac-type phenol or resorcinol resins.

These aromatic organic groups R and $R^1$ can be substituted on their aromatic ring by a substituent which does not participate in the reaction, such as an alkyl group containing 1 to 4 carbon atoms (e.g., methyl or ethyl), alkoxy groups containing 1 to 4 carbon atoms (e.g., methoxy or ethoxy), a halogen atom (e.g., chlorine or bromine), or a nitro group and the like.

Examples of suitable aromatic organic groups of the invention include those derived from biphenyl, diphenylmethane, alpha, alpha-dimethylphenylmethane (bisphenol A), alpha,alpha'-bis(hydroxy)-p-diisopropylbenzene, diphenyl ether, diphenyl dimethylene ether, diphenyl thioether, diphenyl ketone, diphenylamine, diphenyl sulfoxide, diphenyl sulfone, triphenyl phosphite and triphenyl phosphate and the like.

In the compounds of the invention, preferably, there is a total of 1 or 2 cyanate ester and propargyl ether substituent groups on any aromatic ring.

The invention includes compounds having at least one cyanate ester group and at least one propargyl ether group of the Formula 3:

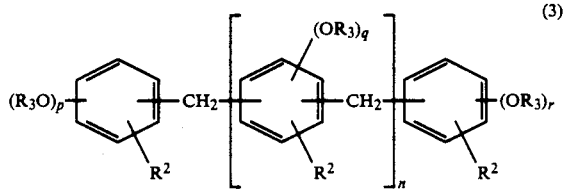
(3)

in which $R^2$ is independently hydrogen or methyl each $R_3$ is independently —$CH_2$—C≡CH or —C≡N; q is 1 to 4; each p and r is independently 1 to 5., and n is about 1–10. Preferably p, q and r each independently is 1 or 2 and n is 6–8.

In the compounds of the invention, preferably in the phenolic starting material, e.g., HO-R-OH wherein R has the meaning described for Formula 1, R contains up to about 70 carbon atoms when a novolac resin or the like and up to about 40, preferably 24, carbon atoms when other than a novolac resin.

The cyanate ester-propargyl ether aromatic compounds of the invention can be prepared by treating the corresponding di or polyhydric phenolic starting material with less than an equivalent amount of a propargyl halide so that one or more of the hydroxy groups are not etherified and subsequently treating the resulting free hydroxy groups in the propargyl ether substituted product with a cyanogen halide. The reverse process or the conducting of the two steps essentially simultaneously can also be used.

Preferably, the phenolic starting material is treated with a propargyl halide, such as chloride or bromide in an aqueous alkaline solution, such as aqueous sodium hydroxide solution as described in U.S. Pat. No. 4,226,800, the disclosures of which are incorporated by reference. One method is by using propargyl chloride in an aqueous sodium hydroxide and water and/or immiscible or water-miscible co-solvent, particularly those which give good phase separation. Suitable solvents include aromatic hydrocarbons, such as toluene; alcohols, such as isopropyl alcohol; ketones, such as methyl isobutyl ketone, or the like can be used. Toluene or methyl isobutyl ketone are preferred.

The free hydroxy groups in the propargyl ether substituted intermediate are treated with a cyanogen halide, such as cyanogen bromide or the like, which can be dissolved in a solvent, such as toluene. Alcohols such as isopropyl alcohol, ketones such as methyl isobutyl ketone, or the like can be used. A slight excess of cyano reactant is preferred.

The reaction is preferably carried out at low temperatures due to the volatility of the cyanogen bromide and the side reaction between cyanogen halide and base when the phenolic is not prereacted with the base. For example, the temperature is from about −40° C. to about 60° C., preferably about −20° C. to about 25° C. The use of conventional inert liquid organic solvents is preferred, including aromatic hydrocarbons, such as benzenes, toluene or xylene; ethers, such as diethyl ether or tetrahydrofuran; acetone; ketones, such as methyl ethyl ketone, methyl isobutyl ketone., or halogenated aliphatic or aromatic hydrocarbons, such as methylene chloride, chlorobenzene and the like. Suitable processes for making cyanate esters are described in U.S. Pat. Nos. 3,553,244, 3,595,900 and the like.

The reaction is conducted in the presence of a base including alkali metal hydroxides, such as sodium hydroxide or the like, and aliphatic amines, such as triethylamine and the like. Cyanogen halide reacts with a free base, such as with triethylamine and the like, to form diethyl cyanamide and ethyl bromide. The phenolic material can be prereacted with the base prior to addition to cyanogen halide.

When low temperatures are not used, prereaction of an amine with the phenolic material forms the phenolate salt. Prereaction with the phenolic material facilitates the reaction by not having free base available. The phenolate salt can then react with the cyanogen halide to form the cyanate ester product. Using the prereaction scheme, one can carry out the reaction at temperatures above room temperature and still achieve desirable conversion. The resulting amine hydrohalide salts are removed by filtration or the like.

The compound of Formula 1 is recovered by conventional techniques such as evaporation of the solvent, precipitation, solvent extraction depending on the properties of the product.

For example:

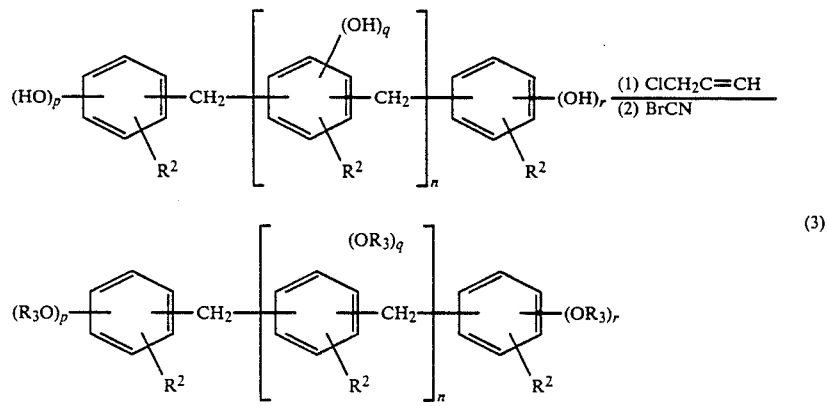

(3)

in which n is 1 to 10 and R² is a hydrogen, or methyl; each R₃ is independently C≡N or CH₂C≡CH; q is 1 to 4; p and r each independently is 1 to 5 and n is 1–10. Preferably, p, q and r each independently is 1 or 2 and n is 6–8. Preferably, R² is o-methyl.

The invention also includes a curable resin composition comprising an aromatic compound having at least one cyanate ester group and at least one propargyl ether group, each independently, directly attached to a ring carbon atom of the aromatic ring(s) of an aromatic (aryl) organic group which contains from about 6 to about 100 carbon atoms, or a prepolymer thereof.

The mixed functionality compounds of the invention give resins which undergo trimerization polymerization at temperatures used with conventional electrical laminate processing. The cured resin has good electrical properties, such as low dielectric constant, high glass transition temperature and low weight loss. The resins of the invention are soluble in conventional varnish solvents. Prepregs are readily prepared and converted into laminates.

Such curable resin composition is useful in the preparation of various articles of manufacture. Thus, the invention also includes prepregs of the above composition as well as shaped articles, reinforced compositions, electrical laminates and the like as hereinafter described from cured or partially cured resin compositions of the compound of the invention.

Thus, the cyanate ester-propargyl ether aromatic compound of the present invention is particularly useful as a monomer, intermediate or prepolymer for the preparation of cyanurate polymers. Polymerization of the monomer is accomplished by heating the monomer to effect thermal polymerization.

The thermal polymerization of the monomer in accordance with this invention, involves trimerization of any terminal cyanato groups to form a cyanurate that has a three-dimensional network structure followed by polymerization of the propargyl ether groups.

For example, R is a divalent aromatic radical having about 2 to 15 aromatic nuclei which can be linked by ether oxygen; carbonyl sulfur, sulfonyl or hydrocarbon bonding and the like defined in Formula I above.

The polymerization of the cyanate ester-propargyl ether aromatic compounds of Formula 1 can be carried out by polymerizing them in solution or in suspension, using as a solvent or suspension medium the common organic solvents such as hydrocarbons, alcohols, ketones, halogenated hydrocarbons, nitrated hydrocarbons, dimethylsulfoxide, dimethylformamide, ether or the like. The solvent can be removed by distillation or simple evaporation during the course of or at the end of the polymerization. The composition is suitable for fiber-reinforced composites applications, for which a fibrous reinforcing material, such as chopped glass, glass fibers, carbon fiber, and the like, in the form of a mat, cloth or continuous fibers, for example, is coated or impregnated with a solution of the compound of Formula 1. The impregnated fibers are usually subjected to a relatively mild heat treatment ("B"-staged) to partially cure the resin to a flexible, tacky state, or "prepreg." The prepreg is then subjected to elevated temperature and pressure so as to completely cure the resin to a hard, inflexible state. A plurality of prepregs can be layered and cured to form a laminate having utility in circuit boards.

The compositions of this invention are cured by heating after applying it to a substrate as a coating or adhesive layer, or after molding or laminating in the form of powder, pellet or as impregnated in a substrate. The curing conditions of the curable composition of this invention depend on the proportion of components constituting the composition and the nature of the components employed. In general, the composition of this invention may be cured by heating at it a temperature within the range of about 0°-300° C., preferably about 100° C.-250° C., although differing according to the presence of a catalyst or curing agent or its amount, or the types of the components in the composition. The time required for heating is generally 30 seconds to 10 hours, although considerably differing according to whether the resin composition is used as a thin coating or as molded articles of relatively large thickness or as laminates or as matrix resins for fiber reinforced composites, particularly for electrical and electronic applications, e.g., when applied to an electrically non-conductive material, e.g., glass, and subsequently curing the composition. Suitable fibrous reinforcing materials include glass fibers, quartz fibers, carbon fibers, boron fibers, Kevlar fibers, Teflon ® fibers (polytetrafluoroethylene) and the like, with woven or continuous glass fibers or carbon fibers being preferred. The fibrous or reinforcing material is present in the composition in an amount effective to impart increased strength to the composition for the intended purpose, and can generally be from about 40 to about 95 weight percent, usually from about 50 to about 80 weight percent, based on the weight of the total composition. When the resin composition of this invention is used for producing molded articles, laminated articles or bonded structures, the curing is desirably effected under pressure. Generally, this pressure is from 10 to 100 $Kg/cm^2$ (gauge).

The composition of this invention cures rapidly, even under mild conditions, so is especially suitable when quantity production and ease of workability are desired. The cured resin made from the composition not only has excellent adhesive force, bond strength, heat resistance, and electric properties, but also is excellent in mechanical properties and resistance to impact, chemicals, moisture and the like. The composition of this invention has a variety of uses as a coating material for rust prevention, flame resistance, flame retardants and the like; as electrical insulating varnish; as adhesive; in laminates to be used for furnitures, building materials, sheathing materials, electrical insulating materials, and the like; and in a variety of moldings.

In a preferred embodiment, the solution is coated on a suitable support, e.g., glass, the solvent is flashed off at about 90° C. to 250° C., and the material advanced to a "B"-staged prepreg. The prepregs are then stacked and cured into a laminate. The laminate is heated to about 140°-240° C., preferably about 170°-200° C. and postcured by heating at about 180°-300° C., preferably 200°-275° C.

Alternatively, the polymerization or curing of cyanate ester-propargyl ether aromatic compounds of Formula 1, in accordance with this invention, can be carried out by first melting the compound and then raising the temperature to a range of about 50 to 240° C., preferably 150° C. to 200° C. and then heating at about 220° C.

The polymerization of the cyanate group usually can be carried out more efficiently with the aid of conventional activators, initiators or catalysts known in the cyanate polymerization art. These polymerization promoting agents representatively include but are not limited to Lewis acids, such as stanneous chloride, aluminum chloride, boron trifluoride, ferric chloride, titanium chloride, and zinc chloride; protonic acids, such as hydrochloric and other mineral acids; salts of weak acids, such as sodium acetate, sodium cyanide, sodium cyanate, potassium thiocyanate, sodium bicarbonate, sodium boronate, and phenylmercuric acetate., and bases, such as sodium methoxide, sodium hydroxide, pyridine, triethylamine, and the like; imidazoles, such as 2-methylimidazole, 2-undecylimidazole, 2-heptadecylimidazole, 2-phenylimidazole, 2-ethyl-4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole and addition product of an imidazole and trimellitic acid; tertiary amines, such as N,N-dimethyl benzylamine, N,N-dimethylaniline, N,N-dimethyltoluidine, N,N-dimethyl-p-anisidine, p-halogeno-N,N-dimethyl-aniline, 2-N-ethylanilino ethanol, tri-n-butylamine, pyridine, quinoline, N-methylmorpholine, triethanolamine, triethylamine, triethylene-diamine, N,N,N',N'-tetramethylbutanediamine, N-methylpiperidine; phenols, such as phenol, cresol, xylenol, resorcinol, and phloroglucin; organic metal salts, such as lead naphthenate, lead stearate, zinc naphthenate, zinc octoate, nickel octoate, tin oleate, dibutyl tin maleate, manganese naphthenate, cobalt naphthenate; peroxides, such as benzoyl peroxide, lauroyl peroxide, octanoyl peroxide, acetyl peroxide, para-chlorobenzoyl peroxide and di-t-butyl diperphthalate; acid anhydrides, such as maleic anhydride, phthalic anhydride, fumaric anhydride, pyromellitic anhydride, trimellitic anhydride, hexahydrophthalic anhydride, hexahydropyromellitic anhydride and hexahydrotrimellitic anhydride; azo compounds, such as azoisobutylonitrile, 2,2'-azobispropane, m,m'-azoxystyrene, hydrozones, and mixtures thereof. Catalysts also include non-ionic coordination compounds, such as cobalt, iron, zinc, and copper acetylacetonates or conventional Group VIII metal addition polymerization catalysts, such as nickel or platinum complexes including nickel acetylacetonate, bis(triphenylphosphine) platinum chloride II and the like. The amount of catalyst used can vary according to the type of catalyst, the compound of Formula I and the reaction conditions, and generally will be about 0.05 to 5 mole percent, preferably about 0.05 to 0.5 mole percent. Zinc II compounds, such as the octoate and the like, are preferred. The curing can also be affected by other conventional means such as ionizing radiation or irradiation of light (UV rays) and the like.

The various cyanate ester-propargyl ether aromatic compounds of this invention [novel compound and (co)polymers] are crystalline or amorphous solids which melt to flowable liquids at convenient working temperatures. They are soluble in a variety of organic solvents such as methylene chloride, chloroform, benzene, toluene, chlorobenzene, acetone, methyl ethyl ketone, ethyl benzoate, ethyl cellulose, dimethylformamide, and the like. They provide excellent bases for solvent-diluted coatings such as brush, spray, and dip coatings, particularly in the case of the higher molecular weight prepolymer type of cyanate ester-propargyl ether. The cyanate ester-propargyl ether aromatic compounds can be used as one-component cured-in-place resins which show good thermal stability along with resistance to solvents and corrosive chemicals such as dilute acids, and basis. The fabrications of shaped articles from these resins is greatly facilitated in that no volatile by-products are liberated during the curing process.

The cyanate ester-propargyl ether aromatic compounds of this invention have relatively high molecular weight and consequently have low volatility and therefore less toxicity and can be conveniently handled at elevated temperatures. The polymers of this invention have improved strength, toughness, and impact resistance and can be used for adhesives, coatings and binders. Resistance to thermal degradation caused by aging at high temperatures is also improved because of a reduced concentration of the relatively less stable cyanurate rings.

The cyanate ester-propargyl ether aromatic compounds of the invention can also be used in the form of a prepolymer. The prepolymer is prepared by polymerizing the polyfunctional cyanate monomer group in the presence of a conventional catalyst, for example, a mineral acid, a Lewis acid, a salt such a sodium carbonate or lithium chloride, or a phosphoric acid ester such as tributyl phosphine. The prepolymer contains a triazine ring generally in the molecule as a result of the trimerization of the cyano group of the cyanate ester. Preferred prepolymers are those having an average molecular weight of at least 400, especially up to 6000.

The cyanate ester-propargyl ether aromatic compound of the invention can be used in the form of a mixture of monomer and the prepolymer. A mixture of a prepolymer of the cyanate ester-propargyl ether monomer and an amine can also be used and is particularly useful as an intermediate to blends with maleimides as herein later described.

As already stated, an amine can be incorporated in the form of a prepolymer of the cyanate ester-propargyl ether aromatic compound and the amine. Examples of the amines can be used in this invention include (i) diamines of the general Formula (3):

$$H_2N-R^3-NH_2 \qquad (3)$$

wherein $R^3$ is a divalent aromatic or alicyclic organic group, especially those illustrated with regards to the production of bismaleimides, and (ii) polyamines such as hexamethylene tetramine, polyethylene imine, polyamino styrene or polyvinyl imidazole; triethylene diamine; imidazoles such as 2-methylimidazole, 2-undecylimidazole, 2-heptadecylimidazole, 2-phenylimidazole, 2-ethyl-4-methylimidazole, 1-benzyl-2-methylimidazole, 1-propyl-2methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole or 1-guanaminoethyl-2-methylimidazole, and adducts formed between these imidazoles and trimellitic acid.

When the amines are incorporated in the composition in the form of prepolymers with the monomer of the invention, the prepolymers can be produced by reacting the monomer with the diamines, preferably using 0.1 to 1 equivalent of the diamines based on the monomer, in a suitable solvent such as ketones at a temperature of about 0° to 100° C. for 1 minute to 1 hour. It is of course permissible to cause free amines to be present in the composition.

When the amines are included in the form of a prepolymer or the like, they are considered to function mainly as a modifier for polymer such as a chain extender.

The curable composition of this invention can comprise one or more components which can each be used in any desired form such as solid, solution or dispersion. These components are mixed in solvent or in the absence of a solvent to form the blend compositions of this invention.

The present invention is also directed to a curable resin composition comprising:
(a) a maleimide monomer, a prepolymer thereof or a prepolymer of a maleimide and an amine; and
(b) a propargyl ether-cyanate ester aromatic monomer described above.

The compositions of the invention are useful for composites and the like, which are thermally stable and curable without a catalyst to give high glass transition temperatures.

The maleimide component of the curable resin composition of this invention, hereinafter referred to as component (a) is selected from maleimides, prepolymers thereof and prepolymers of the maleimides and amines.

The maleimides employed in the present invention are conventional organic compounds known in the art and include those compounds having two or more maleimide groups derived from maleic anhydrides and diamines or polyamines. Suitable maleimides are represented by the following general formula (4)

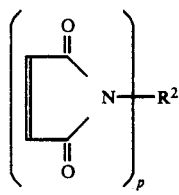

(4)

wherein p is 2 to 4 and $R^2$ is a divalent aromatic (aryl) aliphatic or alicyclic organic group containing about 1 to 50 carbon atoms. Suitable bismalimides are represented by the formula (5)

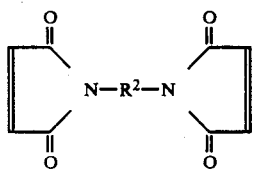

(5)

wherein $R^2$ is a divalent aromatic (aryl), aliphatic or alicyclic organic group containing about 2 to about 40 carbon atoms.

Examples of the divalent organic group $R^2$ in the formula (4) include (i) aromatic, aliphatic or alicyclic hydrocarbon groups containing about 3 to about 20 and, preferably, 6 to 16 carbon atoms, such as isopropylidene, phenylene, naphthylene, xylene, cyclohexylene or hexahydroxylene, and (ii) organic groups consisting of a plurality of aromatic rings bonded to each other directly or through a bridging atom or group, for example, those expressed by the following formula (2)

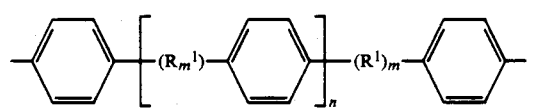

(2)

wherein each m is independently zero or 1; n is zero or 1, and each $R^1$ is independently a divalent aliphatic or aromatic hydrocarbon or aromatic ether group, containing up to about 14 carbon atoms, an oxygen atom, a sulfur atom, a carbonyl group, or sulfonyl group, a sulfinyl group, an alkyleneoxyalkylene group containing up to 4 carbon atoms in each alklylene group, an amino group,

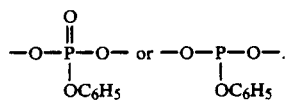

In formulas (4 or 2), the divalent organic group $R^2$ can contain an organic group which does not participate in the reaction, such as an alkyl group containing 1 to 4 carbon atoms (e.g., methyl or ethyl), or an alkoxy group containing 1 to 4 carbon atoms (e.g., methoxy or ethoxy), at the aromatic ring when it is an aromatic organic group or at the alicyclic ring when it is an alicyclic organic group. Preferably, the bismaleimide is the bismaleimide of methylene dianiline.

The maleimide can be prepared by a method known per se which comprises reacting maleic anhydride with diamines or polyamines containing up to about 50, preferably, 24 carbon atoms, and then cyclodehydrating the resulting maleimide acids. The diamines and polyamines are preferably aromatic diamines in view of the thermal stability of the final resins. When it is desired to improve the flexibility or suppleness of the resin, alicyclic diamines or polyamines can be used alone or in combination with the aromatic diamines or polyamines. From the viewpoint of reactivity, the diamines are preferably and especially primary diamines, but secondary diamines or polyamines can also be used. Examples of suitable diamines are m-phenylene diamine, m-, or p-xylylenediamine, 1,4-cyclohexane diamine, hexahydroxylylene diamine, 4,4'-bisaminophenyl methane, 4,4'-bisaminophenyl sulfone, bis(4-amino-3-methylphenyl) methane (MDT), bis(4-amino-3,5-dimethylphenyl)methane (MDX), 4,4'-bisaminophenylcyclohexane, 4,4'-bisaminophenyl ether, 2,2-bis(4'-aminophenyl)-propane, 2,2-bis(4-amino-3-methylphenyl) methane, and alpha,alpha'-bis(4-aminophenyl) phenyl-methane, alpha,alpha'-bis(4-aminophenyl-p-diisopropyl- benzene. Polyamines suitable for use in the invention include hexamethylene tetramine, polyethylene imine, polyamino styrene or polyvinyl imidazole; triethylene diamine; imidazoles such as 2-methylimidazole, 2-undecylimidazole, 2-heptadecylimidazole, 2-phenylimidazole, 2-ethyl-4-methylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole or 1-cyanoethyl-2-phenylimidazole or 1-guanaminoethyl-2-methylimidazole, and adducts formed between these imidazoles and trimellitic acid.

The maleimide can be used either alone or in admixture of two or more.

Prepolymers of the maleimides and, preferably, prepolymers of the maleimides and amines can also be used as component (a).

As already stated, an amine can be incorporated in the form of a prepolymer of the maleimide and the amine as component (a). Examples of the amines that can be used in this invention include diamines of the formula (3) previously described.

When the above-mentioned amines are used in the form of a prepolymer with maleimides, the prepolymer can be produced by reacting the maleimide and the amine, especially 1 mol of the maleimide and ½ to 1 mole of the diamine, in a suitable solvent such as ketones under the known conditions, for example, by heating at a temperature of about 40° C. to 250° C. for 4 minutes to 5 hours. The prepolymer derived from the maleimide and the diamine, although differing according to the ratio of the monomers or the degree of polyaddition, are considered to have the structure represented by the following formula (6):

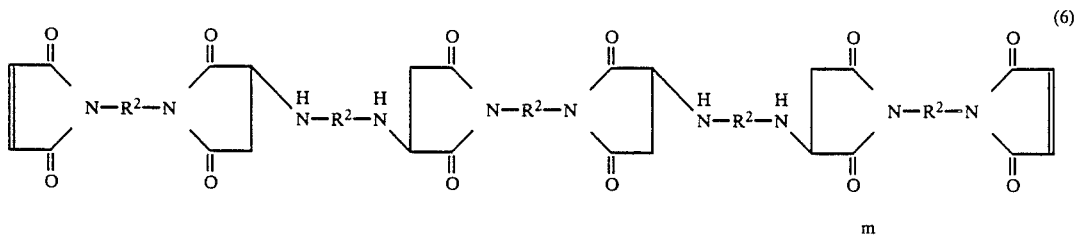

(6)

wherein m is zero or a positive number, generally not more than 10, and $R^2$ is the same as defined hereabove.

In the case of adding amines in the form of prepolymers it is of course permissible to cause free amines to be present in the composition.

When the amines are included as component (a) in the form of a prepolymer, they are considered to function mainly as a modifier for polymer such as a chain extender.

Suitable maleimides for component (a) are disclosed in U.S. Pat. Nos. 4,110,364, 4,298,720 and the like, which are incorporated herein by reference. For example, the mixing procedure comprises mixing solutions of cyanate ester-propargyl ether component and maleimide either separately or together in a suitable inert organic solvent, such as, for example, ketones such as methyl ethyl ketone, chlorinated hydrocarbons such as methylene chloride, ethers and the like, and homogenizing the resulting mixed solution at room temperature or at an elevated temperature below the boiling point of the solvents to form a composition in the form of a solution. When homogenizing these solutions at room temperature or at an elevated temperature, some reactions may take place between the constituent elements. So long as the resins components are maintained in the state of solution without gelation, such reactions do not particularly affect the operability of the resulting composition in, for example, a bonding, coating, laminating or molding operation.

Other components of blends include acetylene polymers, epoxy polymers, olefin polymers and/or engineering thermo-plastics.

The curable resin compositions of invention can be used in the above solution form as adhesives, paint vehicles, molding materials to be impregnated in substrates, or laminating materials. In this case, the concentration of the resin solid in the solution is determined so that the optimum operability can be obtained according to the desired utility.

The resin compositions of this invention can also be used for various purposes in the form of dried powder, pellets, resin-impregnated product or compound. For example, compositions with the individual components uniformly mixed can be obtained by uniformly mixing the resin components in solution, and then removing the solvents from the homogeneous solution at reduced pressure or at an elevated temperature. Alternatively, solids components are kneaded at room temperature or at an elevated temperature to form a homogenized resin composition.

A variety of additives may be added to the curable composition to impart specific properties provided that they do not impair the essential properties of the resulting resin. Examples of the additives include natural or synthetic resins, fibrous reinforcement, fillers, pigments, dyestuffs, thickening agents, wetting agents, lubricants, flame-retardants and the like.

The resin composition of this invention can also contain a white pigment such a titanium dioxide, a colored pigment such as yellow lead, carbon black, iron black, molybdenum red, prussian blue, ultramarine, cadmium yellow or cadmium red, and other various organic and inorganic dyes and pigments in order to color the compositions. In addition to the above colored pigments, the resin compositions can also contain a rust-proofing pigment such as zinc chromate, red lead, red iron oxide, zinc flower or strontium chromate, an anti-sag agent such as aluminum stearate, a dispersing agent, a thickener, a coat modifier, a body pigment or a fire retardant, which are known additives for paints.

The invention compositions are useful as sheet molding compositions, in structural applications such as automobile parts, coatings and electrical laminates. For such electrical applications, the properties of flame retardants and high Tg are important.

Illustrative Embodiments

The present invention is further illustrated by the following examples which are not intended to be construed as limitations upon the invention.

Embodiments I–III

Into a 5000 mls four-neck flask equipped with a stirrer, reflux condenser, and thermocouple was added 2700 mls of toluene and 625 grams of o-cyresylic novolac resin (mol wt. of 625 with average hydroxy functionality of 5). After the o-cresylic novolac was completely dissolved, 212 grams of a 50% solution of sodium hydroxide in water was slowly added over 30 minutes at room temperature. After the hydroxide addition had been completed, the temperature was raised to 60° C. and 447 grams of propargyl chloride was added slowly over 1.5 hours from a dropping funnel. After the addition had been completed, the temperature was increased to reflux (78° C.) and maintained for 3 hours. This procedure converted half of the hydroxyl groups to propargyl ether groups.

The second part of the procedure converted the remainder of the hydroxyl groups into cyanate ester groups. Into a four-neck 5000 mls round-bottom flask equipped with a reflux condenser, dropping funnel, thermocouple, and stirring rod, was added 212 grams of cyanogen bromide and 2700 mls of toluene. The temperature of the solution was reduced to 0° C. with the aid of a salt ice bath. In a separate container, 529 grams of the 50% propargyl ether prepared in step one above and 183 grams of triethylamine was reacted and cooled to 0° C. The 50% propargyl ether/triethylamine solution was transferred to the dropping funnel and slowly added to the cyanogen bromide-toluene solution over a 3-hour time period. Stirring was continued overnight with the temperature gradually increasing to room temperature. The triethylamine hydrobromide salt was removed by filtration and the filtrate washed several times with deionized water. The toluene was removed by vacuum distillation yielding 448 grams of propargyl ether/cyanate ester product (I).

The procedure above was essentially repeated with the solvent being methyl isobutyl ketone, methyl ethyl ketone, isopropyl alcohol or water.

The procedure was also essentially repeated except that in the second part (conversion to cyanate ester) the residual hydroxyls groups were prereacted with a base at temperatures up to 60° C. The converted phenolate salt was then added to cyanogen halide at temperatures up to 60° C. with good conversion to the desirable product.

The procedure was also essentially repeated except the first conversion step was to 25% hydroxyl groups with the second steps conversion to 75% cyanate esters to give product (II).

The procedure was essentially repeated except the first step was the conversion of 75% hydroxyl groups and the second step the remainder of the hydroxyl groups to give product (III).

The usefulness of these resins was demonstrated by their use in composites such as in electrical applications. It is highly soluble in a number of low boiling solvent such as isopropyl alcohol, acetone, methyl ethyl ketone and the like which conform well to varnish preparation for electrical prepregging. The following varnish formulation of the propargyl ether/cyanate product I is typical of such a formulation as set forth in Table 1 below.

TABLE 1

| Varnish Formulation and Properties of I | |
|---|---|
| | Grams |
| Varnish Formulation: | |
| 50% Propargyl Ether/50 Cyanate Ester (I) | 82 |
| Acetone | 35 |
| Zinc Octoate (8% solution) | 0.08 |
| Properties: | |
| Gel Time, 171° C., Sec | 104 |
| Prepreg Time, 163° C., Min | 2.4 |
| % Resin on Prepreg | 50.5 |
| Laminate Properties: | |
| % Resin on Laminate | 41 |
| Dielectric Constant, 1 mhz and | 3.7 |
| 7628 Glass (8-ply construction) | |
| Dissipation Factor | 0.007 |
| TGA* 5% Weight Lost Temp, °C. | 427 |
| Tg by DMA,** Max in Damping, °C., | 342 |

TABLE 1-continued

| Varnish Formulation and Properties of I | |
|---|---|
| | Grams |
| Tan Delta Max,*** °C. | 352 |

*Thermagravimetric analyses.
**Dynamic mechanical analyzer.
***A DMA spectra in which the minimum of modulus is determined.

Table 2 below sets forth the thermal properties as indicated by the Tg (Tan delta) as a function of the cyanate ester-propargyl ether group.

TABLE 2

| Low Dielectric Varnishes of a Propargyl Ether/Cyanate Aromatic Compound | | | |
|---|---|---|---|
| Product | % CN | % PE | Tan Delta |
| Comparative Varnish | 100% | | 275 |
| III | 75% | 25 | 325 |
| I | 50 | 50 | 351.5 |
| II | 25 | 75 | 292 |

Embodiments IV-VII

The 0-cresylic novolac resin (mol wt. of 625 with average hydroxy functionality of 5) and toluene were charged into the reaction vessel and dissolved with stirring. An aqueous solution of sodium hydroxide was added, and the resulting solution heated to 60° C. in sufficient base to convert half the OH groups to the sodium salt. Propargyl chloride was slowly added over one hour. The resulting mixture was heated to reflux and held for three hours (75°–79° C.) and phase separated. The brine phase was removed. The resulting material was washed with hot water, vacuum distilled to remove the toluene and the intermediate product collected.

Cyanogen bromide and toluene were charged into a separate reaction flask and cooled to 5° C. Triethylamine was added to the toluene solution containing the propargyl ether from the first half synthesis and cooled to 5° C. and the resulting mixture introduced into the reaction flask over two hours. After addition was completed, the mixture was allowed to stir overnight. The triethylamine hydrobromide salt was removed by filtration and the organic phase was washed several times and the brine removed. The resulting mixture was vacuum distilled, keeping the temperature below 60° C. The products were made into the varnishes as set forth in Table 3 and into laminates and castings having he properties set forth in Table 4. It should be noted that the dielectric properties are increased by the presence of ionic impurities such as NaBr.

TABLE 3

| VARNISH FORMULATION AND REACTIVITIES | | | | |
|---|---|---|---|---|
| | LAMINATE #1 | LAMINATE #2 | LAMINATE #3 | LAMINATE #4 |
| CYANATE ESTER-PROPARGYL ETHER (70% IN DMK* | | | | |
| IV | 42.85 G | — | — | — |
| V | — | — | — | 50 G |
| VI | — | — | 117.14 G | — |
| VII | — | 53.34 G | — | — |
| 8% ZINC OCTOATE | 0.03 G | 0.06 G | 0.08 G | 0.021 G |
| GEL TIME, 171° C., SECS. | 64 | 182 | 104 | 167 |
| | PREPREG | | | |
| PREPREG TIME, 163° C., MINS. | 1.5 | 3.75 | 2.5 | 3.25 |
| % RESIN ON PREPREG | 50.2 | 49.3 | 50.6 | 50.5 |

*DIMETHYL KETONE.

TABLE 4

| | LAMINATE AND CASTING PROPERTIES | | | |
|---|---|---|---|---|
| | LAMINATE #1[a] | LAMINATE #2[b] | LAMINATE #3[b] | LAMINATE #4[a] |
| % RESIN ON LAMINATE | 35.0 | 30.0 | 41.0 | 38.2 |
| DIELECTRIC CONSTANT HP 4194A (1 MHZ) | 3.46 | 3.66 | 3.77 | 4.40 |
| DMA[c] | | | | |
| DAMPING PEAK, °C.[d] | 323.9 | 348.3 | 342.3 | 343.3 |
| TAN DELTA MAX[e], °C. | 340.3 | 352.4 | 351.5 | 353.5 |
| TGA,[f] 5% WT LOSS | 385.45 | 435.0 | — | 439.3 |
| RESIDUAL @ 500° C., % | 81.42 | 88.73 | — | 88.82 |
| TMA[g], PPM/C | 62.6 | — | — | 18.5/26:0 |
| NaBr, BR, PPM | 36.0 | 56.0 | 121.0 | 190.0 |
| H$_2$O, % | 0.27 | 0.27 | 0.29 | 0.15 |
| PHENOLIC OH | — | 0.0078/0.017 | 0.0003 | — |

[a]1 HR, 180° C. @ 50 PSI, 2 HRS, 220° C. @ 50 PSI AND POST CURE 1 HR, 250° C. IN OVEN.
[b]1 HR, 180° C. @ 50 PSI, 2 HRS, 220° C. @ 50 PSI AND POST CURE 2 HRS, 250° C. IN OVEN.
[c]DYNAMIC MECHANICAL ANALYZER.
[d]MAXIMUM IN DMA DAMPING PEAK.
[e]REAMETRIC SPECTRA IN WHICH THE MINIMUM OF MODULUS IS DETERMINED.
[f]THERMAGRAVIMETRIC ANALYSES.
[g]THERMAL MECHANICAL ANALYZER.

Embodiment VIII

In order to demonstrate the ability to cure blends containing propargyl ether-cyanate ester (I) with bis-maleimide of methylene diamine, 20 grams of each component were placed in a beaker with a stirring bar on a hot plate. The temperature was increased to the softening point of the propargyl ether cyanate ester (I) at which time the mixture became homogeneous. The mixture was placed in an oven at 200° C. for 2 hours and 1 hour at 275° C. The sample was found to be completely cured by DSC. Furthermore, the cured mixture was stable up to 375° C. without any indications of thermal decomposition (by DSC). By thermagravimetric analyses, the 5% weight loss temperature was 392° C.

What is claimed is:

1. A aromatic compound having at least one cyanate ester and at least one propargyl ether group each independently directly attached to ring carbon atoms of an aromatic organic group which contains from about 6 to about 100 carbon atoms.

2. An aromatic compound of the Formula 1

$$\underset{\underset{(OCH_2-C\equiv CH)_n}{\overset{|}{R}}}{(OC\equiv N)_m} \quad (1)$$

wherein m is a number of at least 1, n is a number of at least 1, and R is an aromatic organic group containing from 6 to 100 carbon atoms comprising an aromatic ring or an aromatic ring bonded directly or through a bridging atom or group or fused to one or more aromatic or cycloaliphatic rings, each aromatic ring of R having from zero to all the available ring positions independently substituted by the cyanate ester or propargyl ether groups.

3. A compound according to claim 2 wherein m + n is 2 to 100.

4. A compound according to claim 3 wherein R is selected from
   (i) residues having a valance of at least 2 and derived from aromatic hydrocarbons containing 6 to 16 carbon atoms
   (ii) organic groups consisting of a plurality of aromatic rings bonded directly or through a bridging atom or group, expressed by the Formula 2:

$$-\underset{}{\bigcirc}-[(R^1_p)-\underset{}{\bigcirc}]_n-(R^1)_p-\underset{}{\bigcirc}- \quad (2)$$

wherein n is 0 or 1, each p is independently 0 or 1, and each $R^1$ is independently a divalent aliphatic or aromatic hydrocarbon group containing up to 14 carbon atoms, an oxygen atom, a sulfur atom, a carbonyl group, a sulfonyl group, a sulfinyl group, and alkyleneoxyalkylene group containing up to 4 carbon atoms in each alkylene group, an imino group:

$$-O-\underset{\underset{OC_6H_5}{|}}{\overset{\overset{O}{\|}}{P}}-O- \text{ or } -O-\underset{\underset{OC_6H_5}{|}}{P}-O-, \text{ or}$$

(iii) groups derived from novolac-type phenol or resorcinol resins.

5. A compound according to claim 4 wherein R is selected from (iii).

6. A compound according to claim 5 wherein R is a novolac-type phenol resin.

7. A compound according to claim 6 of the formula (3)

$$(R_3O)_p-\underset{\underset{R^2}{|}}{\bigcirc}-CH_2-[\underset{\underset{R^2}{|}}{\bigcirc}(OR_3)_q-CH_2]_n-\underset{\underset{R^2}{|}}{\bigcirc}-(OR_3)_r \quad (3)$$

in which $R^2$ is independently hydrogen or methyl, each $R_3$ is independently —$CH_2$—$C\equiv CH$ or $C\equiv N$, q is 1 to 4, each p and r is independently 1 to 5, and n is about 1-10.

8. A compound according to claim 7 wherein the resin is prepared from using o-cresol as the phenol.

9. An aromatic compound which is prepared by treating a di or polyhydric phenolic material with a propargyl halide in an amount less than that equivalent to the hydroxy content of the phenolic material and then treating the resulting propargyl ether phenolic material with a cyanogen halide.

10. A compound according to claim 9 wherein the phenolic material is a novolac-type phenolic resin.

11. A compound according to claim 10 wherein the resin is prepared using o-cresol as the phenol.

12. A process of preparing a cyanate ester-propargyl ether aromatic compound of Formula 1 in claim 1 which comprises treating a di or polyhydric phenol bonded directly or through a bridging atom or group or fused to one or more aromatic or cycloaliphatic rings, each aromatic ring of R having from zero to all of the available ring positions independently substituted material with a propargyl halide in an amount less than that equivalent to the hydroxy content of the phenolic material and then treating the resulting propargyl ether phenolic with a cyanogen halide.

13. A process according to claim 12 wherein the phenolic material is a novolac-type phenolic resin.

14. A process according to claim 13 wherein the resin is prepared using o-cresol as the phenol.

15. A curable resin composition comprising;
(a) a maleamide monomer, a prepolymer thereof or a prepolymer of a maleamide and an amine; and
(b) a cyanate ester-propargyl ether aromatic compound having at least one cyanate ester and at least one propargyl ether group each independently directly attached to ring carbon atoms of an aromatic organic group which contains from about 6 to about 100 carbon atoms, a prepolymer thereof or a prepolymer with an amine.

16. A composition according to claim 15 wherein (a) is a bismaleamide and has the formula (1)

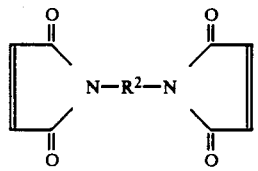

wherein R2 is a divalent aromatic, aliphatic or cycloaliphatic group containing 2 to 40 carbon atoms.

17. A composition according to claim 16 wherein (a) is a prepolymer of a bismaleamide and an amine.

18. A composition according to claim 16 wherein the bismaliamide is the bismaleamide of methylene dianiline.

19. A composition according to claim 16 wherein the ratio by weight of component (a) to component (b) is in the range of about 70:30 to about 30:70.

20. A composition according to claim 16 wherein the ratio of (a) to (b) is in the range of about 70:30 to about 40:60.

21. A composition according to claim 18 wherein the ratio of (a) to (b) is about 50:50.

22. A prepreg comprising a composition according to claim 15.

23. A fibrous reinforced composition comprising a fibrous reinforcing material having applied thereto a composition according to claim 15 which is subsequently cured.

24. A composition according to claim 23 wherein the fibrous reinforcing material is selected from the group consisting of glass fibers, quartz fibers, carbon fibers, boron fibers, Kevlar fibers and polytetrafluoroethylene fibers.

25. A composition according to claim 24 having a glass transition temperature of at least about 200° C.

26. A laminate composition comprising a composition of claim 15.

27. An electrical insulating laminate comprising a composition according to claim 15 applied to an electrically non-conductive material and subsequently curing said composition.

28. The cured composition of claim 15 having a glass transition temperature of at least about 150° C.

29. A composition according to claim 15 wherein (b) is an aromatic compound of the formula 1

wherein m is a number of at least 1, n is a number of at least 1, and R is an aromatic organic group containing from 6 to 100 carbon atoms comprising an aromatic ring or an aromatic ring bonded directly or through a bridging atom or group or fused to one more aromatic or cycloaliphatic rings, each aromatic ring of R having from zero to all the available ring positions independently substituted by the cyanate ester or propargyl ether groups.

30. A composition according to claim 29 wherein m+n is 2 to 100.

31. A composition according to claim 30 wherein R is selected from
(i) residues having a valence of at least 2 and derived from aromatic hydrocarbons containing 6 to 16 carbon atoms;
(ii) organic groups consisting of a plurality of aromatic rings bonded directly or through a bridging atom or group, expressed by the Formula 2:

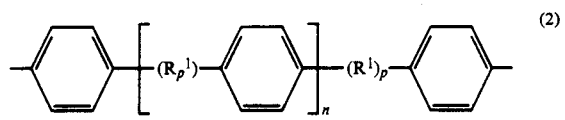

wherein n is 0 or 1, each p is independently 0 or 1, and each R¹ is independently a divalent aliphatic or aromatic hydrocarbon group containing up to 14 carbon atoms, an oxygen atom, a sulfur atom, a carbonyl group, a sulfonyl group, a sulfinyl group, and alkyleneoxyalkylene group containing up to 4 carbon atoms in each alkylene group, an imino group:

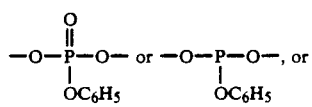

(iii) groups derived from novolac-type phenol or resorcinol resins.

32. A composition according to claim 31 wherein R is selected from (iii).

33. A composition according to claim 32 wherein R is a novolac-type phenol resin.

34. A composition according to claim 33 of the formula (3)

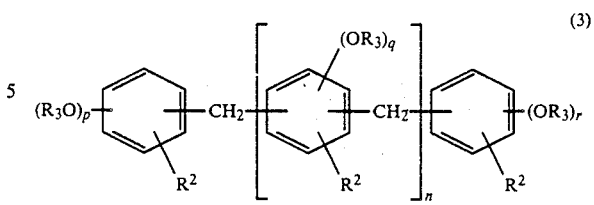

in which $R^2$ is independently hydrogen or methyl, each $R_3$ is independently —$CH_2$—C≡CH or —C≡N, q is 1 to 4, each p and r is independently 1 to 5, and n is about 1–10.

35. A composition according to claim 34 wherein the resin is prepared from using o-cresol as the phenol.

* * * * *